United States Patent
Kumeuchi et al.

(10) Patent No.: US 12,258,734 B2
(45) Date of Patent: Mar. 25, 2025

(54) WORKING CONTROL DEVICE IN WORKING VEHICLE

(71) Applicant: Takeuchi Mfg. Co., Ltd., Nagano (JP)

(72) Inventors: Kengo Kumeuchi, Chikuma (JP); Yuta Kobayashi, Tomi (JP); Shumpei Okutani, Ueda (JP); Koichi Shimizu, Ueda (JP)

(73) Assignee: Takeuchi Mfg. Co., Ltd., Nagano (JP)

(*) Notice: Subject to any disclaimer, the term of this patent is extended or adjusted under 35 U.S.C. 154(b) by 216 days.

(21) Appl. No.: 17/579,266

(22) Filed: Jan. 19, 2022

(65) Prior Publication Data

US 2023/0133546 A1    May 4, 2023

(30) Foreign Application Priority Data

Nov. 1, 2021   (JP) .................... 2021-178942

(51) Int. Cl.
*E02F 9/22*    (2006.01)

(52) U.S. Cl.
CPC .......... *E02F 9/2235* (2013.01); *E02F 9/2228* (2013.01)

(58) Field of Classification Search
CPC .............................. E02F 9/2228; E02F 9/2235
See application file for complete search history.

(56) References Cited

U.S. PATENT DOCUMENTS

| | | | |
|---|---|---|---|
| 6,397,591 B1 | 6/2002 | Tsuruga et al. | |
| 10,954,968 B2 | 3/2021 | Kumeuchi et al. | |
| 2011/0265457 A1* | 11/2011 | Sato | F02M 26/15 60/285 |

(Continued)

FOREIGN PATENT DOCUMENTS

| | | | |
|---|---|---|---|
| EP | 2444555 A1 | 4/2012 | |
| EP | 3719213 A1 * | 10/2020 | ............. E02F 3/425 |

(Continued)

OTHER PUBLICATIONS

The extended European search report issued by the European Patent Office on Jul. 27, 2022, which corresponds to European Patent Application No. 22154560.1-1002 and is related to U.S. Appl. No. 17/579,266.
An Office Action; "Notice of Reasons for Refusal," mailed by the Japanese Patent Office on Nov. 21, 2023, which corresponds to Japanese Patent Application No. 2021-178942 and is related to U.S. Appl. No. 17/579,266; with English language translation.

*Primary Examiner* — Abiy Teka
*Assistant Examiner* — Daniel S Collins
(74) *Attorney, Agent, or Firm* — Studebaker Brackett PLLC

(57) ABSTRACT

A working control device comprises a hydraulic actuator such as the boom cylinder 36, the bucket cylinder 38, the operation device 160 that is operated by an operator to drive the hydraulic actuator, a hydraulic oil supply source consisting of the electric motor M1 and the hydraulic pump P1 that delivers hydraulic oil required to drive the hydraulic actuator; and a delivery oil amount control device (the controller for controlling rotation of the electric motor) that controls an amount of oil to be delivered from the hydraulic oil supply source in response to an operation of the operation device. The delivery oil amount control device is configured to perform a supplying oil amount control to deliver from the hydraulic oil supply source a required amount of oil for the hydraulic actuator to have a working speed corresponding to the operation of the operation device.

11 Claims, 10 Drawing Sheets

(56) References Cited

U.S. PATENT DOCUMENTS

2017/0292243 A1  10/2017  Okada et al.
2020/0318319 A1* 10/2020  Shimizu ................ E02F 9/2004
2020/0318656 A1  10/2020  Kumeuchi et al.

FOREIGN PATENT DOCUMENTS

| JP | 2000-227103 A | 8/2000 |
| JP | 5096417 B2 | 12/2012 |
| JP | 2018-105487 A | 7/2018 |
| JP | 2020-169708 A | 10/2020 |

* cited by examiner

WORKING CONTROL DEVICE IN WORKING VEHICLE

TECHNICAL FIELD

The present invention relates to a working control device in a working vehicle, and more particularly to a working control device in a working vehicle comprising a hydraulic actuator.

TECHNICAL BACKGROUND

In recent years, as global warming countermeasures, an action to reduce a discharge amount of carbon dioxide using an electric motor instead of an internal combustion engine has been adopted. Even in a working vehicle such as a hydraulic shovel (excavator), a working vehicle using electric motor driving has been developed, and has been gradually introduced into the market. Under such a situation, there is a problem that an operational duration time period, which is determined depending on a battery capacity, of the electric motor is shorter than that of the internal combustion engine, and power required to drive the electric motor is required to be made as small as possible.

For example, Japanese Patent Publication No. 5096417 owned by the same applicant of the present application discloses a hydraulic shovel comprising two electric motors and configured to make respective hydraulic cylinders (boom cylinders, etc.) of a traveling motor and a shovel device work using hydraulic oil from a hydraulic pump to be driven by the first electric motor and make a turning motor and a blade cylinder work using hydraulic oil from a hydraulic pump to be driven by the second electric motor while generating a pilot pressure. In the hydraulic shovel, energy consumption in the two electric motors can be suppressed because a rotational speed (the number of revolutions per unit time) of the second electric motor (the electric motor for turning or the like) can be kept low during only the respective workings of the traveling motor and the shovel device and a rotational speed of the first electric motor (the electric motor for traveling or the like) can be kept low during only the respective workings of the turning motor and the blade cylinder.

A working control device used for the conventional hydraulic shovel controls a discharge flow rate from the hydraulic pump by feedback control to determine the discharge flow rate from the hydraulic pump based on a difference between a hydraulic pressure on the side of the hydraulic pump and a hydraulic pressure on the side of a hydraulic actuator. Thus, the working control device tends to be relatively low in control responsiveness. Therefore, in the control of the discharge flow rate, there is a problem that a control delay occurs so that hunting easily occurs in a situation where a differential pressure rapidly changes and responsiveness easily deteriorates in a situation where the differential pressure only slightly changes. In view of the foregoing, Japanese Laid-Open Patent Publication No. 2020-169708(A) discloses a hydraulic shovel using a working control device capable of controlling a discharge flow rate from a hydraulic pump while preventing hunting and a deterioration in responsiveness in control of the discharge flow rate, although owned by the same applicant of the present application.

SUMMARY OF THE INVENTION

Problems to be Solved by the Invention

Oil amount control to deliver oil from the hydraulic pump depending on an operation amount of an operation device is performed to prevent responsiveness from deteriorating in the working control device disclosed in Japanese Laid-Open Patent Publication No. 2020-169708(A). However, the working control device is configured to be able to perform feedback control to control the discharge flow rate from the hydraulic pump based on a difference between a hydraulic pressure on the side of the hydraulic pump and a hydraulic pressure on the side of a hydraulic actuator in the hydraulic shovel when proposed. That is, a hydraulic control valve using a load sensing restriction function for generating the above-described differential pressure is used. Accordingly, the above-described hydraulic pressure difference occurs by a load sensing restrictor. Thus, there is a problem that a discharge hydraulic pressure on the side of the hydraulic pump increases to correspond to the hydraulic pressure difference and required driving power of the hydraulic pump increases so that required power of the electric motor that drives the hydraulic pump increases.

The present invention has been made in view of the problem, and is directed to providing a working control device in a working vehicle configured to be able to appropriately perform discharge oil amount control of a hydraulic pump depending on an operation amount of an operation device while abolishing a load sensing restriction function and to be able to suppress a required energy for hydraulic pump driving.

Means to Solve the Problems

To attain the above-described object, a working control device according to a first aspect of the present invention comprises, in a working vehicle (e.g., a hydraulic shovel 1 in the embodiment) with a hydraulic working device (e.g., a crawler mechanism 15, an upper turning body 20, a shovel device 30 in the embodiment), a hydraulic actuator (e.g., traveling motors 16L and 16R, a swing cylinder 34, a boom cylinder 36, an arm cylinder 37, a bucket cylinder 38, a blade cylinder 19) for driving the hydraulic working device, an operation device (e.g., an operation device 160) that is operated by a worker (an operator) to drive the hydraulic working device upon making the hydraulic actuator work, a hydraulic oil supply source (e.g., a first hydraulic pump P1 and a first electric motor M1 in the embodiment) that delivers hydraulic oil required to drive the hydraulic actuator, and a delivery oil amount control device (e.g., a controller 150 that performs rotation control of the first electric motor M1) that controls an amount of oil to be delivered from the hydraulic oil supply source in response to an operation of the operation device, in which the delivery oil amount control device is configured to perform a supplying oil amount control to deliver from the hydraulic oil supply source a required amount of oil for the hydraulic actuator to have a working speed corresponding to an operation of the operation device.

The working control device having the above-described configuration preferably further comprise a hydraulic oil supply control device that is provided in a flow path leading to the hydraulic actuator from the hydraulic oil supply source and controls an area of the flow path in response to an operation of the operation device, in which the hydraulic oil supply control device performs a control of setting the flow path area in response to an operation of the operation device so as to pass a required oil amount without limitation but to limit supply of hydraulic oil exceeding the required oil amount.

Further, in the working control device having the above-described configuration, the hydraulic oil supply control device preferably comprises a hydraulic oil supply control valve provided in an oil path leading to the hydraulic actuator from the hydraulic oil supply source.

A working control device according to a second aspect of the present invention comprises, in a working vehicle with a hydraulic working device that performs a plurality of workings, a plurality of hydraulic actuators for making the hydraulic working device perform the plurality of workings, an operation device enabling a plurality of operations to be performed by a worker (operator) to make the plurality of hydraulic actuators selectively or compositely work to drive the hydraulic working device, a hydraulic oil supply source that delivers hydraulic oil required to drive the plurality of hydraulic actuators, a delivery oil amount control device that controls an amount of oil to be delivered from the hydraulic oil supply source in response to operations of the operation device, and a plurality of hydraulic oil supply control devices that are respectively provided in a plurality of flow paths leading to the plurality of hydraulic actuators from the hydraulic oil supply source and each control an area of the flow path in response to the corresponding operation of the operation device, in which the delivery oil amount control device performs a supplying oil amount control to deliver from the hydraulic oil supply source an amount of oil corresponding to a total amount of oil amounts respectively required to make the plurality of hydraulic actuators work at speeds corresponding to operations of the operation device, and the plurality of hydraulic oil supply control devices each control the area of the flow path in response to the corresponding operation of the operation device and control the flow path area in response to operations of the operation device so as to pass a required oil amount for the hydraulic actuator to have a working speed corresponding to the corresponding operation of the operation device without limitation but to limit supply of the hydraulic oil exceeding the required oil amount.

In the working control device having the above-described configuration, a pressure compensation valve is provided in each of the plurality of hydraulic oil supply control devices, and the pressure compensation valve limits, when control to make the plurality of hydraulic actuators compositely work upon compositely operating the operation device has been performed, an amount of supply oil to the hydraulic actuator having a lower hydraulic oil pressure among the plurality of hydraulic actuators and keeps a supply oil amount balance.

In the working control device having the above-described configuration, the hydraulic oil supply control device preferably comprises a plurality of hydraulic oil supply control valves respectively provided in a plurality of oil paths leading to the plurality of hydraulic actuators from the hydraulic oil supply source.

In the working control device having the above-described configuration, the hydraulic oil supply control device preferably comprises a hydraulic pump to be driven by an electric motor, and the delivery oil amount control device preferably controls the number of revolutions of the electric motor. In this case, the hydraulic pump is preferably a fixed displacement type hydraulic pump. The hydraulic pump may be a variable displacement type hydraulic pump.

In the working control device having the above-described configuration, the hydraulic oil supply source may comprise a variable displacement type hydraulic pump to be driven by an engine, and the delivery oil amount control device may perform variable displacement control of the hydraulic pump.

Advantageous Effects of the Invention

With the working control device in the working vehicle according to the first aspect of the present invention, the delivery oil amount control device performs the supplying oil amount control to control an amount of oil to be delivered from the hydraulic oil supply source in response to an operation of the operation device and deliver from the hydraulic oil supply source an amount of oil required for the hydraulic actuator to have the working speed corresponding to an operation of the operation device. Therefore, a load sensing restrictor can be abolished. A delivery oil amount control of the hydraulic pump can be appropriately performed depending on an operation amount of the operation device, and a required energy for hydraulic pump driving can be kept minimum required.

With the working control device in the working vehicle according to the second aspect of the present invention, the delivery oil amount control device performs the supplying oil amount control to deliver from the hydraulic oil supply source the amount of oil corresponding to the total oil amount of the oil amounts respectively required to make the plurality of hydraulic actuators work at the speeds corresponding to the operations of the operation device, and the plurality of hydraulic oil supply control devices each control the flow path area in response to the corresponding operations of the operation device and perform control to set the flow path area in response to the operations of the operation device to pass hydraulic oil in the required oil amount for the hydraulic actuator to have the working speed corresponding to the operations of the operation device without limitation but to limit supply of hydraulic oil exceeding the required oil amount. Therefore, a load sensing restrictor can be abolished, delivery oil amount control of the hydraulic pump can be appropriately performed depending on an operation amount of the operation device, and required energy for hydraulic pump driving can be kept to a necessary minimum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

An embodiment of the present invention will be described below with reference to the drawings. In the present embodiment, a crawler type hydraulic shovel (excavator) will be described as an example of a working vehicle comprising a working control device according to the present invention. First, an entire configuration of the hydraulic shovel 1 will be described principally with reference to FIG. 1.

Figure 1:
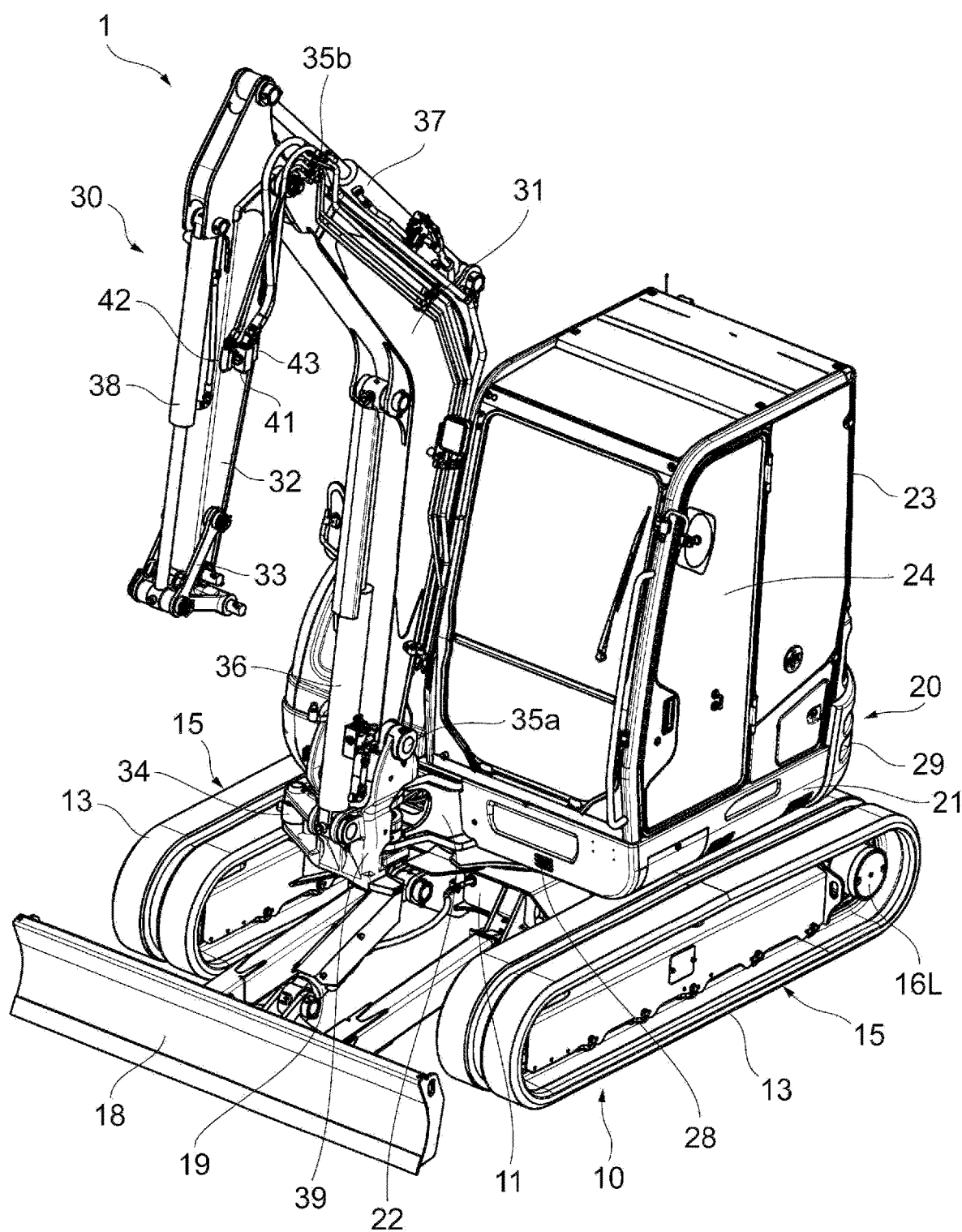
FIG. 1 is a perspective view of a hydraulic shovel comprising a working control device according to the present invention.

The hydraulic shovel 1 is configured to include a lower traveling unit 10 being capable of traveling, an upper turning body 20 provided to be horizontally turnable on the top of the lower traveling unit 10, and a shovel device 30 provided on the front of the upper turning body 20, as illustrated in FIG. 1. The lower traveling unit 10, the upper turning body 20, and the shovel device 30 are driven by a hydraulic actuator.

The lower traveling unit 10 comprises a pair of left and right crawler mechanisms 15 each including a drive wheel, a plurality of driven wheels, and a crawler belt 13 laid around the wheels, respectively, on both left and right sides of a traveling unit frame 11. The left and right crawler mechanisms 15 respectively include left and right traveling motors 16L and 16R (hydraulic actuators) that drive the drive wheels to rotate. The lower traveling unit 10 can travel in any direction and at any speed by controlling a rotational direction and a rotational speed of the left and right traveling motors 16L and 16R. A blade 18 is provided to be vertically swingable on the front of the traveling unit frame 11. The blade 18 is vertically swingable by making a blade cylinder 19 (a hydraulic actuator) provided astride between itself and the traveling unit frame 11 work to extend and contract.

A turning mechanism is provided in the center of the top of the traveling unit frame 11. The turning mechanism includes an inner ring fixed to the traveling unit frame 11, an outer ring fixed to the upper turning body 20, a turning motor 26 (a hydraulic actuator, see FIG. 2) provided in the upper turning body 20, and pipes and a swivel joint for supplying hydraulic oil from a hydraulic pump provided in the upper turning body 20 to the left and right traveling motors 16L and 16R and the blade cylinder 19 provided in the lower traveling unit 10. The upper turning body 20 is attached to be horizontally turnable to the traveling unit frame 11 via the turning mechanism and is turnable in left and right directions with respect to the lower traveling unit 10 by making the turning motor 26 work to normally or reversely rotate.

A main-body-side bracket 22 protruding forward is provided in the front of the upper turning body 20. The shovel device 30 comprises a boom bracket 39 attached to be swingable in left and right directions with a vertical axis as the center to the main-body-side bracket 22, a boom 31 attached to be vertically swingable (raising/lowering movable) via a first swing pin 35$a$ to the boom bracket 39, an arm 32 attached to be vertically swingable (bending/extending movable) via a second swing pin 35$b$ to a distal end of the boom 31, and a link mechanism 33 provided at a distal end of the arm 32. The shovel device 30 further comprises a swing cylinder 34 (a hydraulic actuator) provided astride between the upper turning body 20 and the boom bracket 39, a boom cylinder 36 (a hydraulic actuator) provided astride between the boom bracket 39 and the boom 31, an arm cylinder 37 (a hydraulic actuator) provided astride between the boom 31 and the arm 32, and a bucket cylinder 38 (a hydraulic actuator) provided astride between the arm 32 and the link mechanism 33.

The boom bracket 39 is swingable in left and right directions with respect to the upper turning body 20 (the main-body-side bracket 22) by making the swing cylinder 34 work to extend and contract. The boom 31 is swingable in up and down directions (raising/lowering movable) with respect to the main-body-side bracket 22 (the upper turning body 20) by making the boom cylinder 36 work to extend and contract. The arm 32 is swingable in up and down directions (bending/extending movable) with respect to the boom 31 by making the arm cylinder 37 work to extend and contract.

Various types of attachments as hydraulic working devices such as a bucket, a breaker, a crusher, a cutter, and an auger device can be vertically swingably attached to the distal end of the arm 32 and the link mechanism 33. The attachment attached to the distal end of the arm 32 is vertically swingable with respect to the arm 32 via the link mechanism 33 by making the bucket cylinder 38 work to extend and contract. First to third attachment connection ports 41 to 43 to which a hydraulic hose for supplying hydraulic oil to the hydraulic actuators in the attachment can be connected are disposed on both left and right side surfaces of the arm 32. The shovel device 30 configured such that the bucket is attached to the distal end of the arm 32 and the link mechanism 33 and is made to swingably work by the bucket cylinder 38 will be described below as an example.

The upper turning body 20 comprises a turning frame 21 the front of which is provided with the main-body-side bracket 22 and an operator cabin 23 provided on the turning frame 21. The operator cabin 23 is formed in a substantially rectangular shape and forms an operation chamber in which an operator (worker) can get and the left side of which is provided with a cabin door 24 being laterally opened and closed. Inside the operator cabin 23, there are provided an operator seat on which the operator sits facing forward, a display device that displays various types of vehicle information in the hydraulic shovel 1, and various types of operation switches to be operated by the operator. Inside the operator cabin 23, there is provided an operation device 160 (see FIG. 2) that is operated by the operator to make the hydraulic actuators work. The operation device 160 includes, as its operation sections when operated by the operator, left and right traveling operation levers or traveling operation pedals (none are illustrated) with which the lower traveling unit 10 is operated to travel, left and right work operation levers 161 and 162 (see FIG. 2) with which the upper turning body 20 and the shovel device 30 are operated to work, and a blade operation lever (not illustrated) with which the blade 18 is operated to work.

In the hydraulic shovel 1, the operator gets in the operator cabin 23 and operates the left and right traveling operation levers (or traveling operation pedals) to be inclined back and forth, thereby making it possible to drive the left and right crawler mechanisms 15 (the traveling motors 16L and 16R)

depending on respective operation directions and operation amounts of the left and right traveling operation levers to travel the hydraulic shovel 1. The left and right work operation levers 161 and 162 are operated to be inclined back and forth and right and left, thereby making it possible to drive the upper turning body 20 and the shovel device 30 depending on the operation directions and the operation amounts of the left and right traveling operation levers to perform work such as excavation.

A horn device 28 is provided in the front of the turning frame 21. When a horn switch in the operator cabin 23 is operated to be pressed, a warning tone to call attention can be generated from the horn device 28 to the periphery of the hydraulic shovel 1. At the back of the turning frame body 20, a mounting chamber, in which a main part of a working control device 100 described below is mounted, is provided at a position behind the operator cabin 23. A counter weight 29 in a curved surface shape is provided to form a rear wall of the mounting chamber.

Figure 2A:
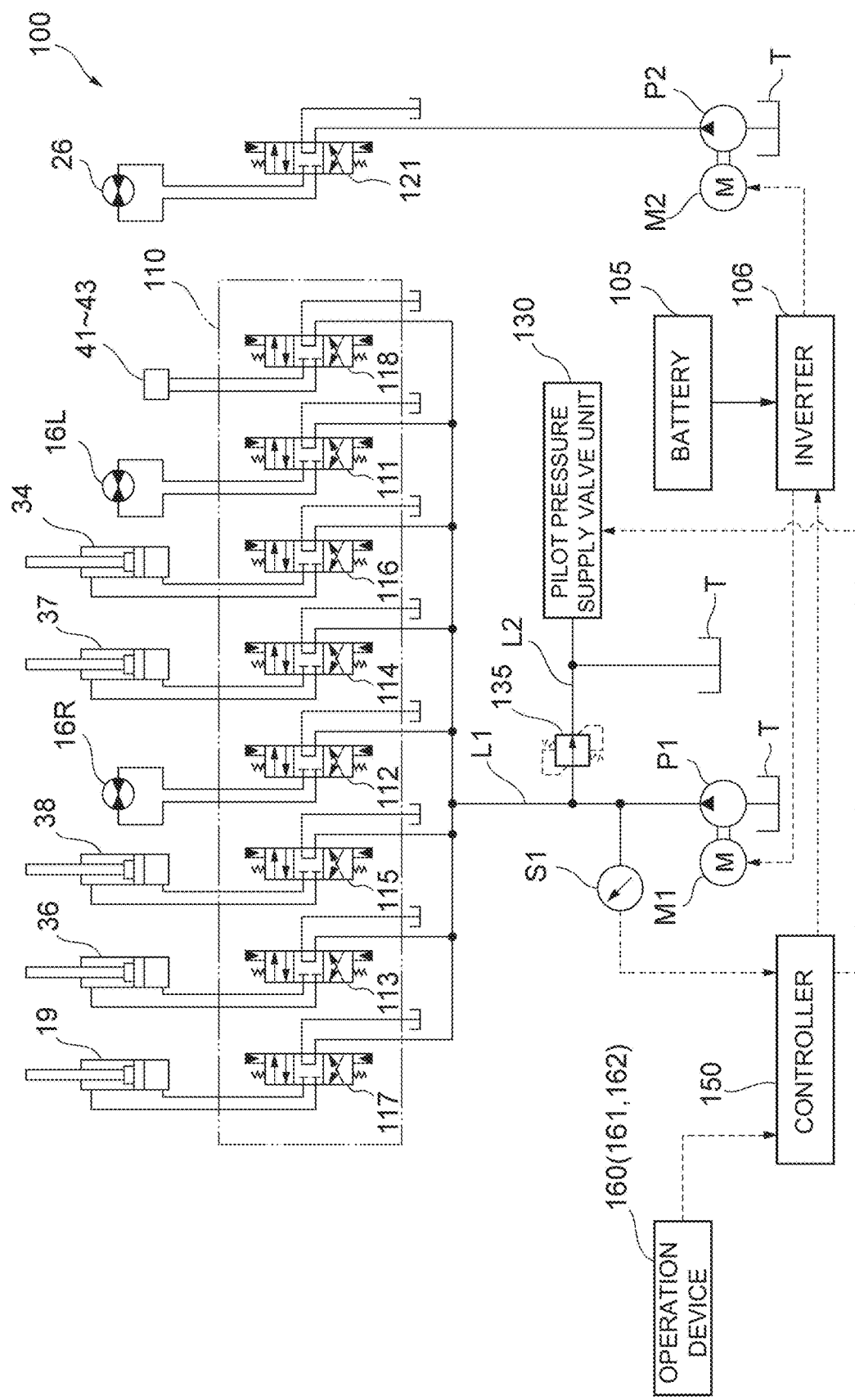
FIGS. 2A and 2B (referred to herein together as "FIG. 2") are hydraulic circuit diagrams illustrating the working control device according to the present invention.
Figure 2B:
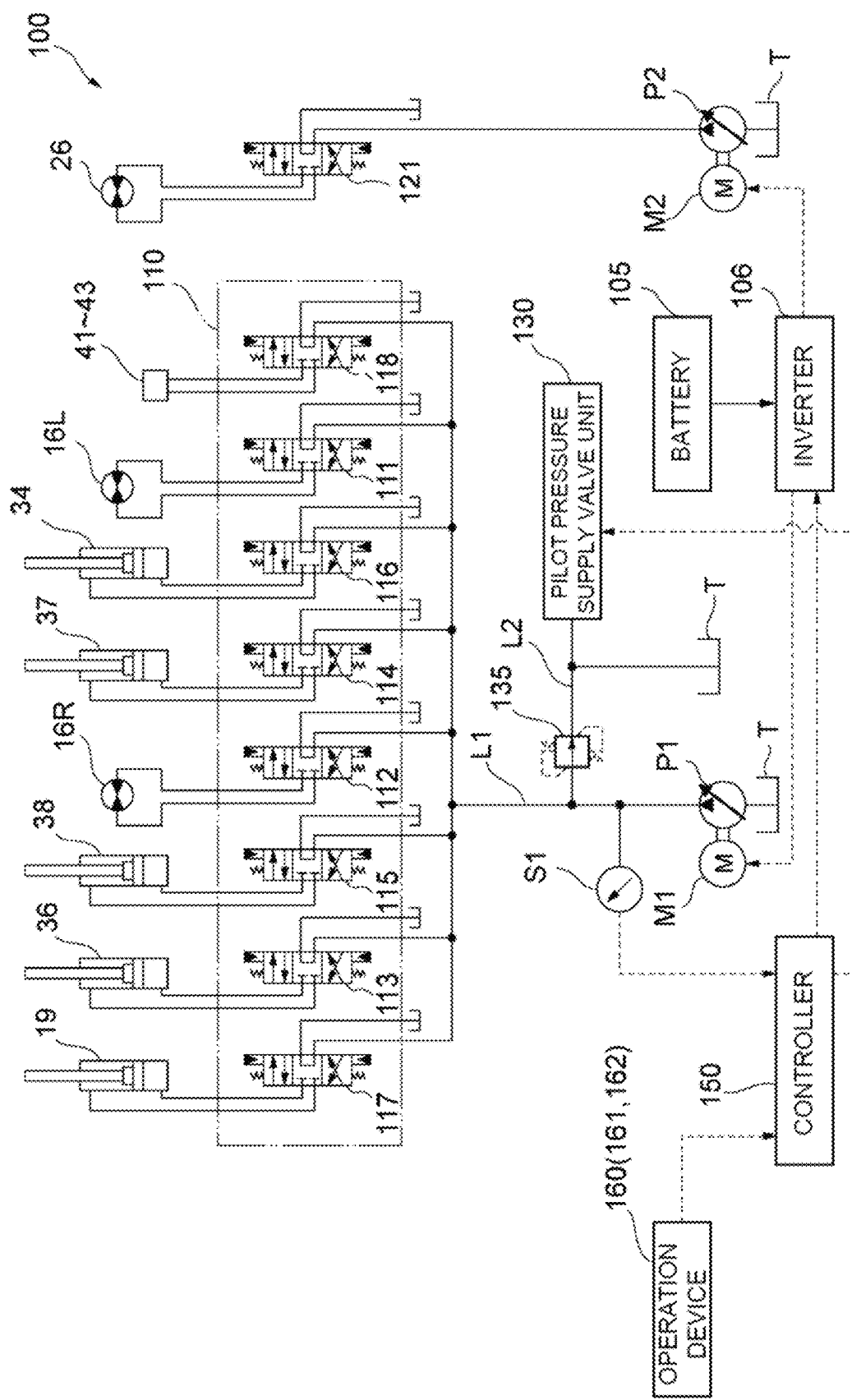

The working control device 100 comprises a hydraulic oil tank T, a fixed displacement type first hydraulic pump P1 that discharges hydraulic oil for making the left and right traveling motors 16L and 16R, the hydraulic actuator for making the shovel device 30 work, and the like work, a fixed displacement type turning hydraulic pump P2 that discharges hydraulic oil for making the turning motor 26 work, a control valve unit 110 that controls a supply direction and a flow rate of hydraulic oil in supplying the hydraulic oil discharged from the first hydraulic pump P1 to the left and right traveling motors 16L and 16R, the hydraulic actuator for making the shovel device 30, and the like, work, a turning control valve 121 that controls a supply direction of hydraulic oil to be discharged from the turning hydraulic pump P2 and supplied to the turning motor 26, and a pilot pressure supply valve unit 130 that supplies a pilot pressure for respectively controlling workings of the control valve unit 110 and the turning control valve 121, as illustrated in FIG. 2.

The control valve unit 110 comprises control valves that control supply/discharge, supply directions, and flow rates of hydraulic oil to be supplied to each of the left and right traveling motors 16L and 16R, the boom cylinder 36, the arm cylinder 37, the bucket cylinder 38, the swing cylinder 34, the blade cylinder 19, and the first to third attachment connection ports 41 to 43. Examples of the control valves include left and right traveling control valves 111 and 112, a boom control valve 113, an arm control valve 114, a bucket control valve 115, a swing control valve 116, a blade control valve 117, and an attachment control valve 118. In each of the control valves 111 to 118, a spool incorporated therein is moved by a pilot pressure to be supplied from the pilot pressure supply valve unit 130. The movement of the spool makes it possible to control supply/discharge, a supply direction, and a flow rate of hydraulic oil to be supplied to each of the hydraulic actuators.

In the turning control valve 121, a spool incorporated therein is moved by a pilot pressure to be supplied from the pilot pressure supply valve unit 130, like in the control valves 111 to 118. In the turning control valve 121, only supply/discharge and a supply direction of hydraulic oil to be supplied to the turning motor 26 are controlled to switch by movement of the spool. Flow rate control of the hydraulic oil to be supplied to the turning motor 26 (i.e., turning speed control of the upper turning body 20) is performed by rotation control of a second electric motor M2.

The pilot pressure supply valve unit 130 is provided in a branch oil path L2 branching from a pump oil path L1 leading to the control valve unit 110 from a discharge port of the first hydraulic pump P1. The branch oil path L2 is provided with a check valve 135 for keeping a hydraulic pressure required for the pilot pressure supply valve unit 130 to generate a pilot pressure. The pilot pressure supply valve unit 130 generates pilot pressures respectively corresponding to operation directions and operation amounts of a traveling operation lever (traveling operation pedal), the work operation levers 161 and 162, and the blade operation lever provided in the operator cabin 23 using hydraulic oil to be discharged from the first hydraulic pump P1, and respectively supplies the pilot pressures to the corresponding control valves. The pilot pressure supply valve unit 130 includes a plurality of electromagnetic proportion type pilot pressure supply valves for respectively supplying the pilot pressures to the corresponding control valves.

The working control device 100 further comprises a first electric motor M1 that drives the first hydraulic pump P1, the second electric motor M2 that drives the turning hydraulic pump P2, a battery 105 (a storage battery) rechargeable from an external power supply or the like, an inverter 106 that converts DC power from the battery 105 into AC power to change a frequency and the magnitude of a voltage, a first pressure sensor S1 that detects a pressure of hydraulic oil (a pump pressure) to be discharged from the first hydraulic pump P1, a controller 150 that performs various types of control (described in detail below), and the above-mentioned operation device 160.

The first and turning hydraulic pumps P1 and P2 are each a fixed displacement type hydraulic pump and respectively discharge hydraulic oils having flow rates corresponding to rotational speeds of the first and second electric motors M1 and M2. That is, discharge oil amounts of the first and turning hydraulic pumps P1 and P2 can be respectively controlled by controlling the rotational speeds of the first and second electric motors M1 and M2. As shown in FIGS. 2-5, a variable displacement type hydraulic pump may be used as the pumps.

Figure 3A:
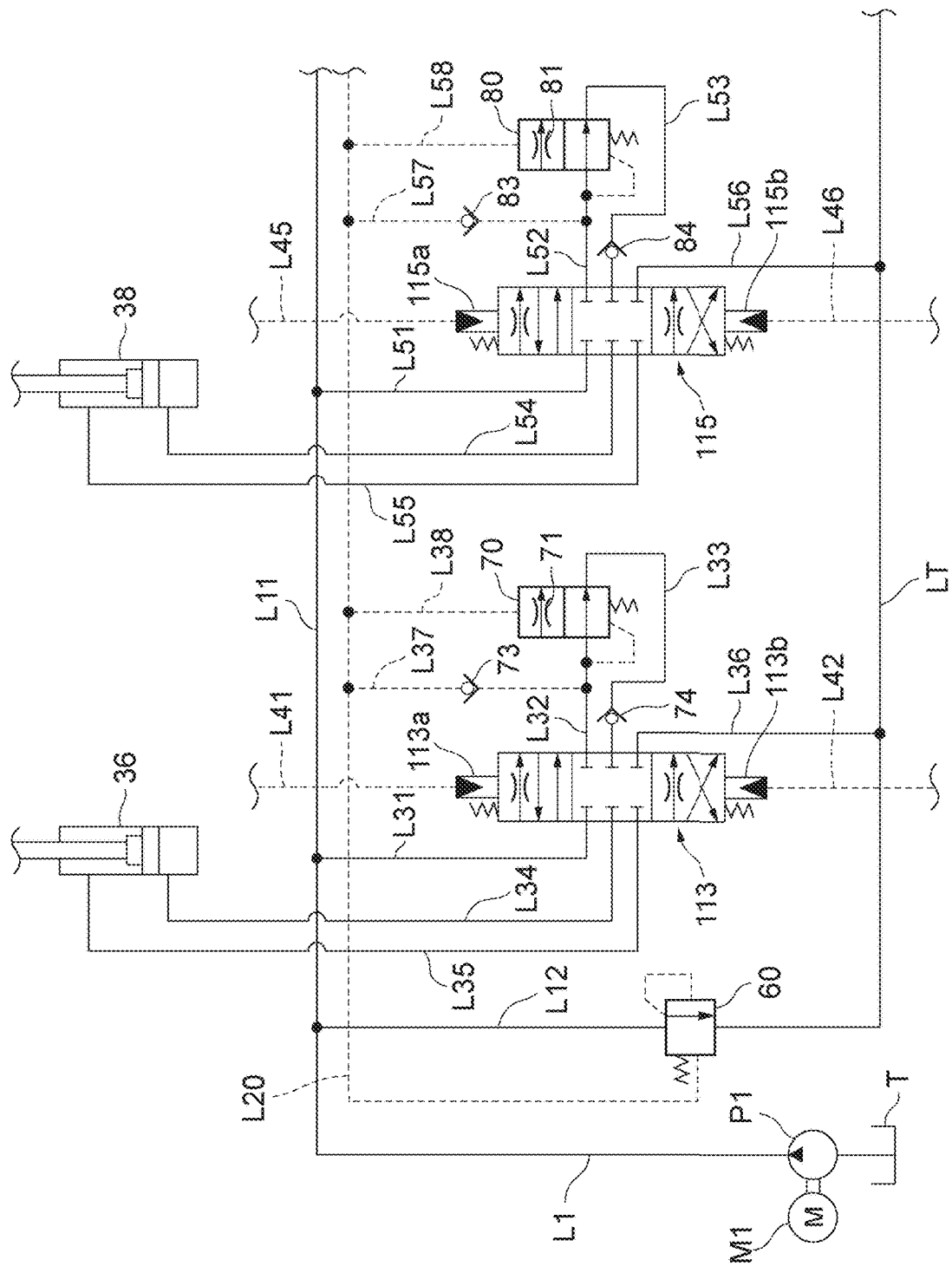
FIGS. 3A and 3B (referred to herein together as "FIG. 3") are hydraulic circuit diagrams illustrating a working control device in a portion that performs working control of a boom cylinder and a bucket cylinder as a specific example of the working control device according to the present invention.
Figure 3B:
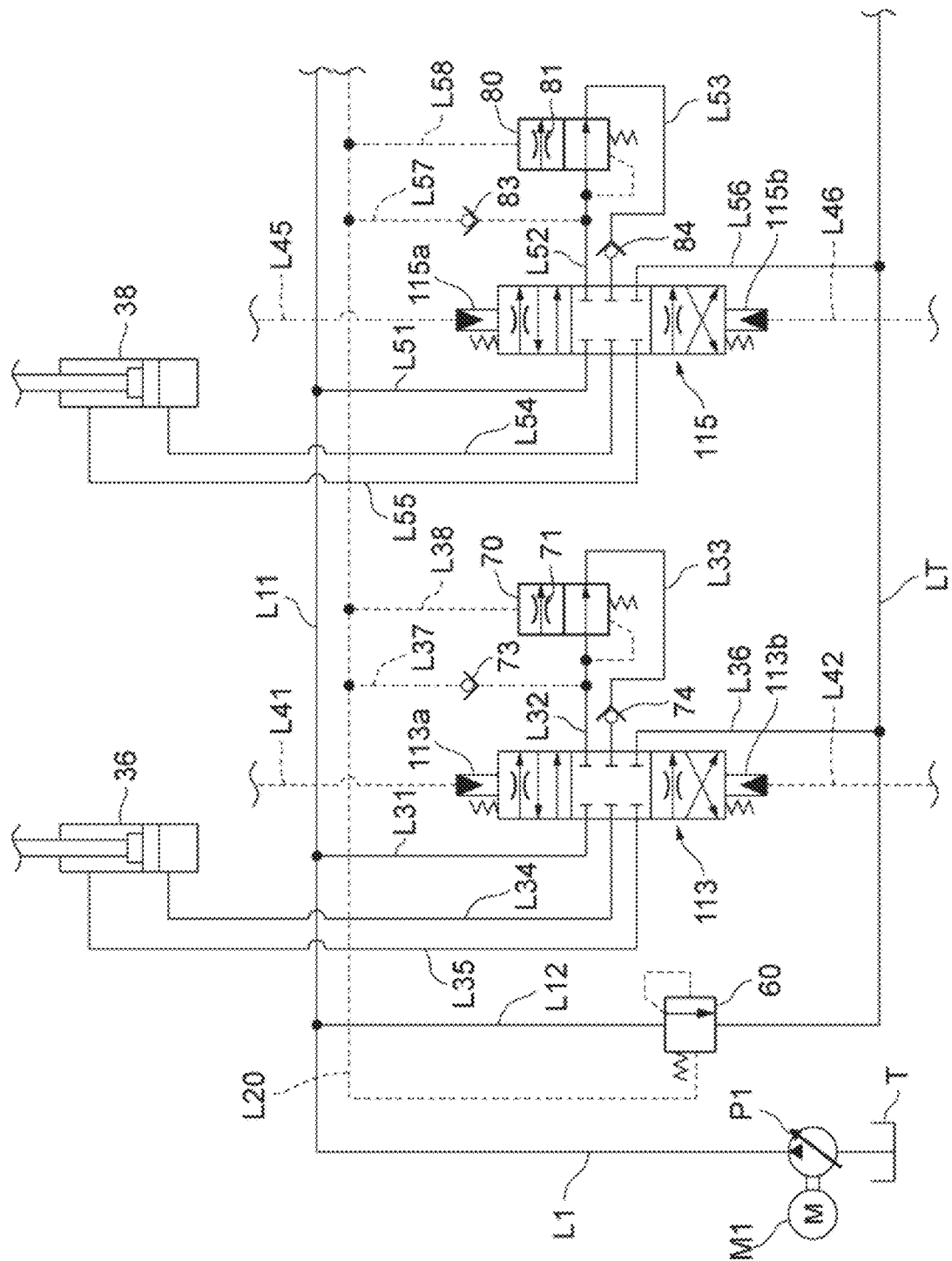

Then, a control content by the controller 150 will be described. As described above, the operator who gets in the operator cabin 23 operates the working operation levers 161 and 162 constituting the operation device 160 to incline the working operation levers back and forth and left and right, thereby making it possible to drive the upper turning body 20 and the shovel device 30 depending on the operation directions and the operation amounts of the working operation levers to perform work such as excavation. Control to perform a boom working lever operation and a bucket working lever operation, respectively, in the working operation levers 161 and 162 will be described below with reference to FIG. 3 in addition to FIG. 2. FIG. 3 is a hydraulic circuit diagram for describing a control content when the controller 150 performs working control of the boom cylinder 36 and the bucket cylinder 38. FIG. 3 illustrates components required to describe working control of the boom cylinder 36 and the bucket cylinder 38 from the control device illustrated in FIG. 2 in an extracted manner.

The working operation levers 161 and 162 are each a joystick type operation lever, and respectively output, when a boom working lever operation (e.g., an operation for inclining the working operation lever 161 back and forth) and a bucket working lever operation (e.g., an operation for inclining the working operation lever 162 right and left) are performed, operation output signals respectively corresponding to the operations are outputted to the controller 150. Specifically, an operation output signal for making the boom cylinder 36 work is outputted when the boom working lever operation is performed, and the operation output signal for making the bucket cylinder 38 work is outputted when the bucket working lever operation is performed. Each of the lever operations is configured to be responsive to its operation amount (operation stroke) to output such an operation output signal that the larger the operation amount is, the higher a signal level (e.g., a voltage value and a current value) is.

The operation output signals to be thus respectively outputted in response to the boom and bucket working lever operations are fed to the controller 150, and the number of driving revolutions of the first electric motor M1 is controlled via the inverter 106. Further, the controller 150 that has received the operation output signals also performs working control of the pilot pressure supply valve unit 130. As a result, working control of the boom control valve 113 and the bucket control valve 115 is performed upon receipt of supply of the pilot pressure by the pilot pressure supply valve unit 130 so that the boom cylinder 36 and the bucket cylinder 38 are controlled to work. The control will be described in detail below with reference to FIG. 3 to FIG. 5.

First, the working control device illustrated in a hydraulic circuit diagram of FIG. 3 will be described. In the working control device illustrated in FIG. 3, the controller 150 performs rotation driving control of the first electric motor M1 via the inverter 106, as illustrated in FIG. 2. When the rotation driving control is thus performed by the first electric motor M1, hydraulic oil in the tank T is discharged into the pump oil path L1 by the first hydraulic pump P1. The pump oil path L1 branches into a first branch pump oil path L11 and a second branch pump oil path L12 and is connected thereto, and the second branch pump oil path L12 is connected to an unload valve 60 to be made to work upon receiving a hydraulic pressure in a feedback oil path L20. Accordingly, respective hydraulic pressures in the pump oil path L1 and the first and second branch pump oil paths L11 and L12 are set depending on the hydraulic pressure in the feedback oil path L20 by the unload valve 60. The hydraulic pressure in the feedback oil path L20 will be described below. Oil to be discharged from the unload valve 60 flows out to a tank oil path LT, and returns to the tank T through the tank oil path LT.

A boom first oil path L31 is provided to be connected to the first branch pump oil path L11. The boom first oil path L31 is connected to the boom control valve 113. The boom control valve 113 is a three-position switching valve including six ports to which six lines (a boom first oil path L31 to a boom sixth oil path L36) are respectively connected. The boom second oil path L32 is connected to an inlet port of a boom pressure compensation valve 70, the boom third oil path L33 is connected to an outlet port of the boom pressure compensation valve 70, the boom fourth oil path L34 is connected to a bottom-side oil chamber of the boom cylinder 36, the boom fifth oil path L35 is connected to a rod-side oil chamber of the boom cylinder 36, and the boom sixth oil path L36 is connected to the tank oil path LT. The boom second oil path L32 is connected to the feedback oil path L20 via a boom pilot oil path L37 including a check valve 73. The check valve 73 is closed when the hydraulic pressure in the feedback oil path L20 is higher than a hydraulic pressure in the boom second oil path L32, and is opened when a reverse pressure relationship holds. A check valve 74 is provided in the boom third oil path L33, to prevent backflow.

The boom control valve 113 has pilot ports 113a and 113b respectively provided at both its ends (upper and lower ends in FIG. 3), and pilot pressure supply oil paths L41 and L42 are respectively connected to the pilot ports 113a and 113b. A boom pilot hydraulic pressure is supplied in response to a boom working lever operation to the pilot pressure supply oil paths L41 and L42 from the pilot pressure supply valve unit 130 so that the boom control valve 113 is controlled to work. FIG. 3 illustrates a state where the boom working lever operation is not performed, a boom working lever is at a neutral position, a pilot pressure is not supplied to the pilot pressure supply oil paths L41 and L42, and the boom control valve 113 is positioned at a neutral position. In this state, all the six ports to which the six lines (the boom first oil path L31 to the boom sixth oil path L36) are respectively connected each enter a closed state.

Figure 4A:
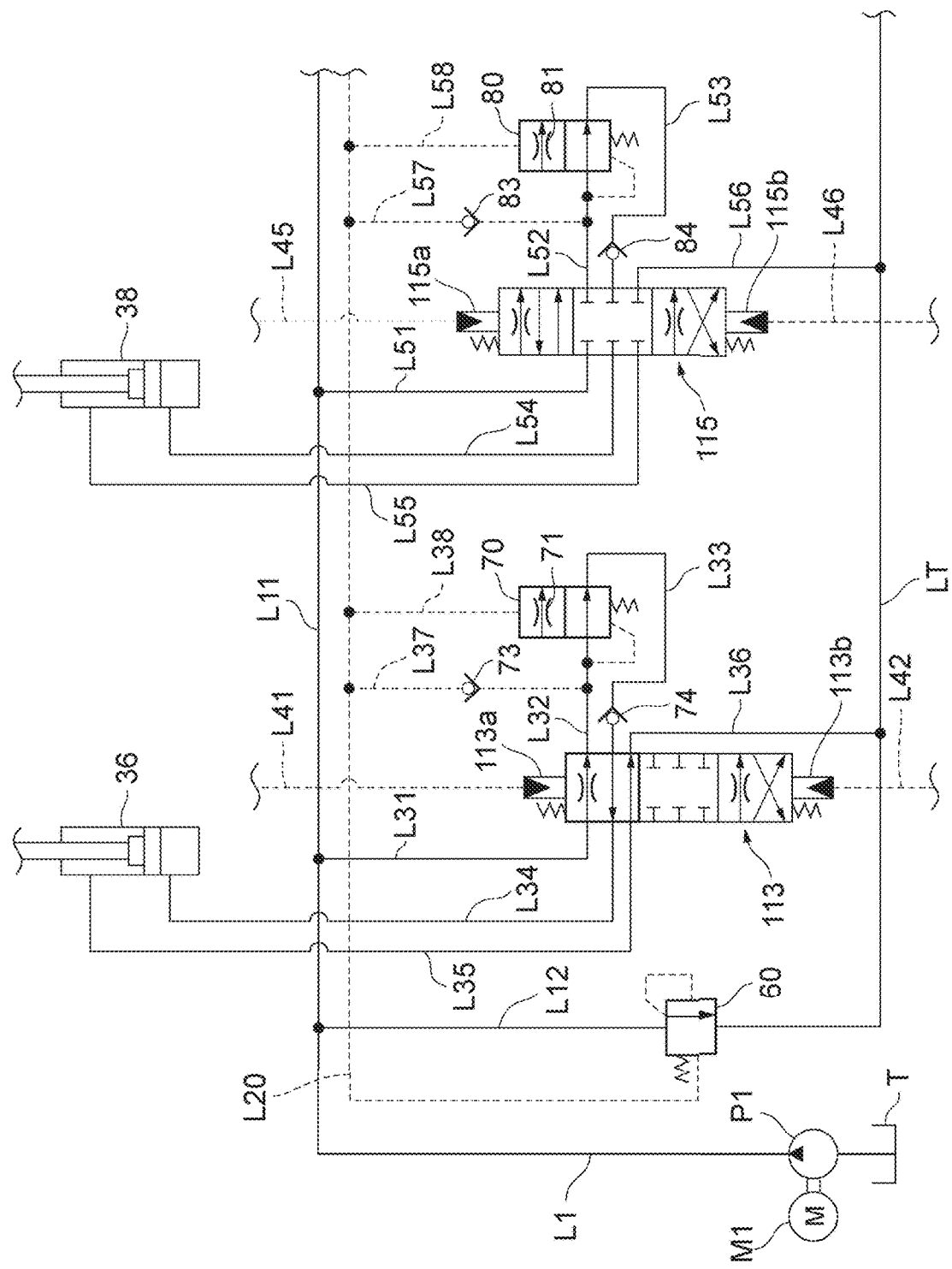
FIGS. 4A and 4B (referred to herein together as "FIG. 4") are hydraulic circuit diagrams illustrating a state where a boom control valve has worked in the hydraulic circuit diagram of FIG. 3.
Figure 4B:
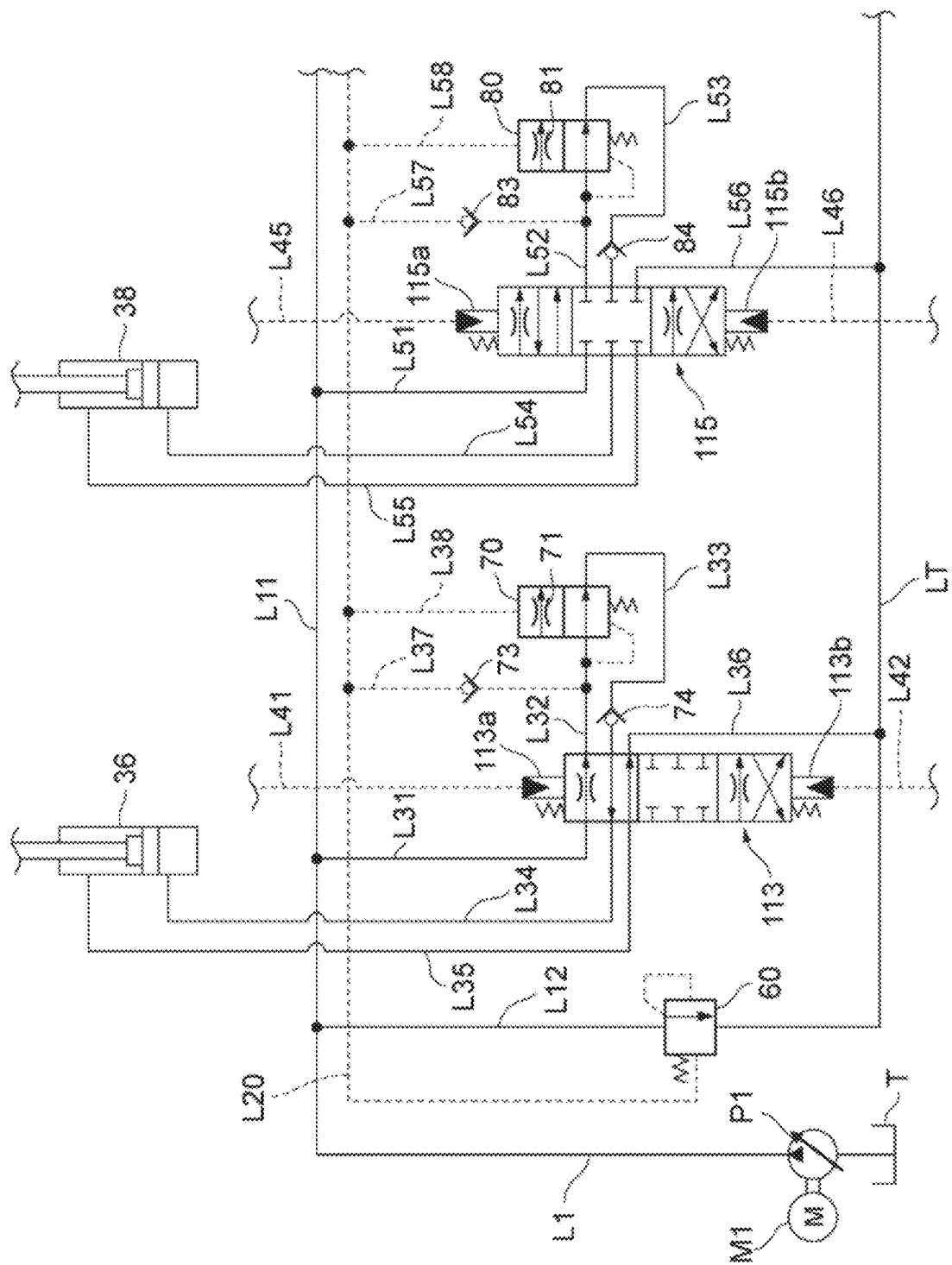
Figure 5A:
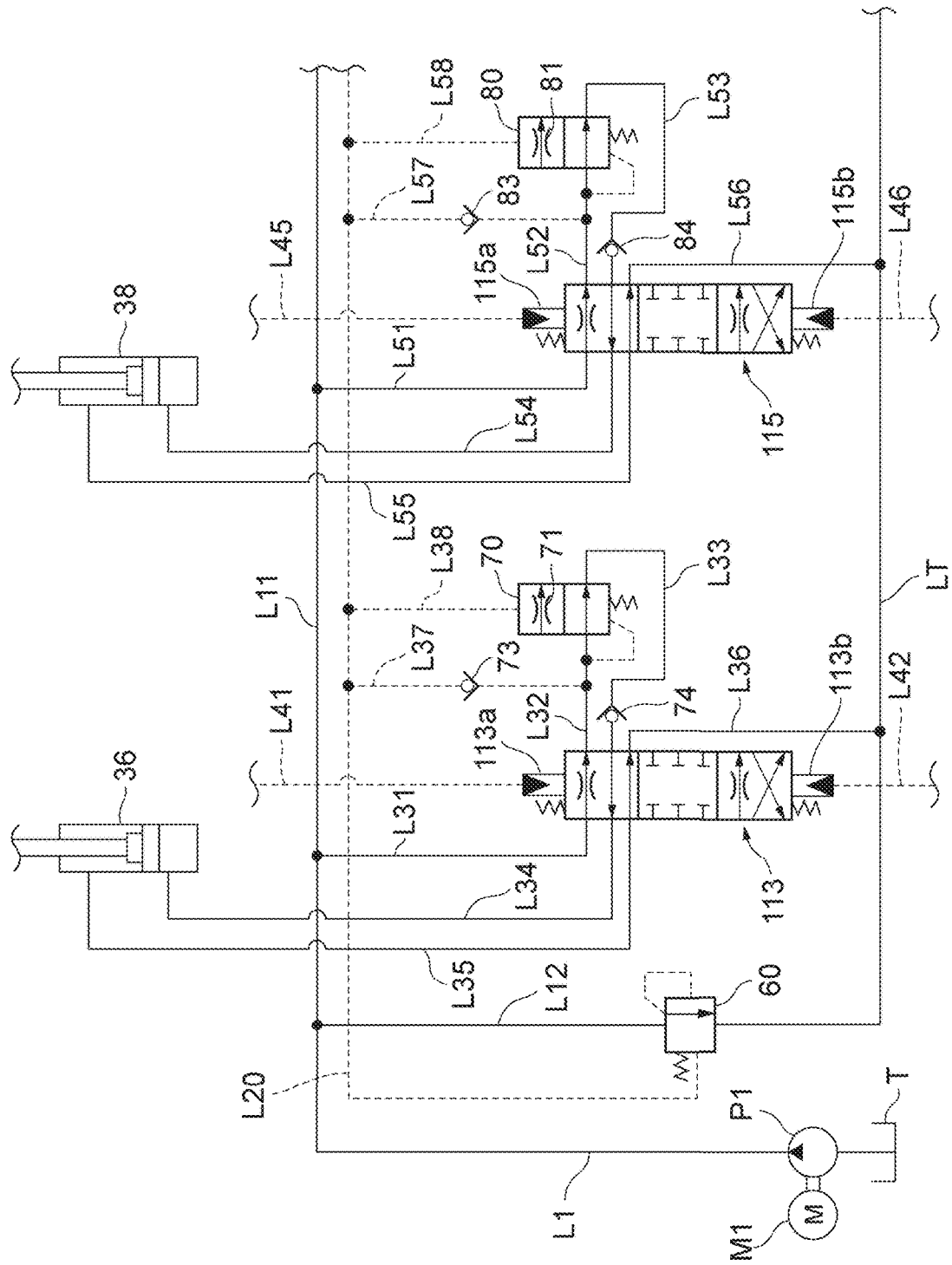
FIGS. 5A and 5B (referred to herein together as "FIG. 5") are hydraulic circuit diagrams illustrating a state where both the boom control valve and a bucket control valve have worked in the hydraulic circuit diagram of FIG. 3.
Figure 5B:
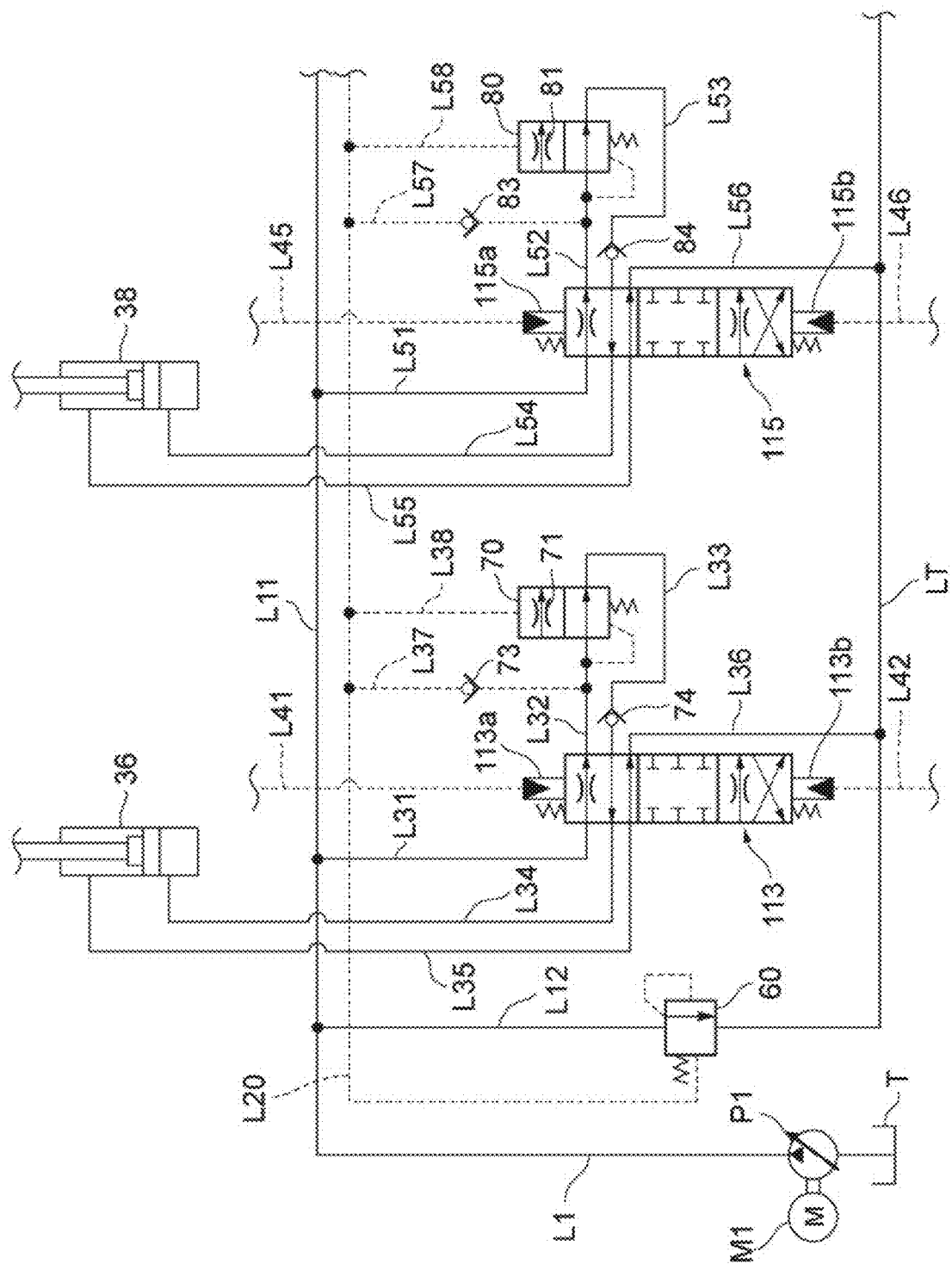

Then, a case where a pilot pressure is supplied to the pilot port 113a from the pilot pressure supply valve unit 130 via the pilot pressure supply oil path L41 by the boom working lever operation being performed will be described. When the pilot pressure is supplied to the pilot port 113a, the boom control valve 113 is moved downward in FIG. 3. This state is illustrated in FIG. 4 and FIG. 5, where the boom first oil path L31 communicates with the boom second oil path L32. A communication opening at this time is set to change depending on the magnitude of the pilot pressure (i.e., the magnitude of an operation amount of the boom working lever operation). That is, in the boom control valve 113, the spool moves upon receiving the pilot pressure, and an opening area A1 of the boom control valve 113 (an area in which the boom first oil path L31 and the boom second oil path L32 communicate with each other) changes depending on a spool movement amount (spool stroke).

Figure 6:
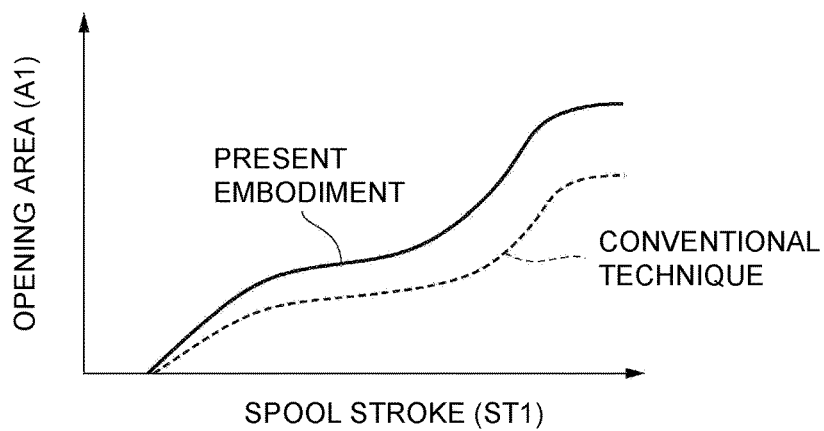
FIG. 6 is a graph illustrating a relationship between a spool stroke (ST1) and a valve opening area (A1) in the boom control valve.

The opening area A1 is set, as indicated by a solid line in FIG. 6, with respect to a spool stroke ST1. The spool stroke ST1 changes depending on the magnitude of the pilot pressure (i.e., the magnitude of the operation amount of the boom working lever operation). A relationship set in a conventional boom control valve is indicated by a broken line in FIG. 6. Thus, in a conventional technique, the conventional boom control valve is made to have a load sensing restriction function by decreasing an opening area with respect to a spool stroke so that a predetermined differential pressure occurs in a portion where the opening area has been decreased. However, the boom control valve 113 in the present embodiment is controlled to have a pump discharge amount corresponding to the magnitude of the operation amount of the boom working lever operation, as described below, whereby a differential pressure need not be produced in this portion. Therefore, the conventional boom control valve 113 is configured not using a load sensing restriction function by increasing the opening area. That is, the opening area A1 illustrated in FIG. 6 is set to such an area as to allow passage of discharge oil from the first pump P1 the discharge amount of which is to be controlled to correspond to the magnitude of the operation amount of the boom working lever operation as it is but to limit a flow rate exceeding the discharge oil amount. In this meaning, the boom control valve may have an oil path switching function, and the opening area A1 need not be variably set. However, when a plurality of valve workings are performed (e.g., when the boom and bucket working lever operations are simultaneously performed), setting as illustrated in FIG. 6 is performed such that oil having a desired flow rate corresponding to each of lever operation amounts can be supplied to the corresponding actuator (the boom cylinder 36 and the bucket cylinder 38).

Further, with the boom control valve 113 moved downward, the boom third oil path L33 communicates with the boom fourth oil path L34, and the boom fifth oil path L35 communicates with the boom sixth oil path L36.

On the other hand, when a pilot pressure is supplied to the pilot port 113b from the pilot pressure supply valve unit 130 via the pilot pressure supply oil path L42 by the boom working lever operation in an opposite direction to that described above being performed, the boom control valve 113 is moved upward in FIG. 3. As a result, the boom first oil path L31 communicates with the boom second oil path L32, the boom third oil path L33 communicates with the boom fifth oil path L35, and the boom fourth oil path L34 communicates with the boom sixth oil path L36.

The boom pressure compensation valve 70 is a two-position switching valve, and receives a hydraulic pressure in the feedback oil path L20 on the side of its upper end and receives a hydraulic pressure in the boom second oil path L32 on the side of its lower end. The boom pressure compensation valve 70 includes a spring that urges the boom pressure compensation valve 70 upward. Accordingly, when the hydraulic pressure in the feedback oil path L20 is smaller than a force obtained by adding a spring urging force to the hydraulic pressure in the boom second oil path L32, there occurs a state where the boom pressure compensation valve 70 moves upward as illustrated, to make the boom second oil path L32 and the boom third oil path L33 communicate with each other as they are. When the hydraulic pressure in the feedback oil path L20 is larger than a force obtained by adding the spring urging force to the hydraulic pressure in the boom second oil path L32, the boom pressure compensation valve 70 moves downward, and the boom second oil path L32 and the boom third oil path L33 communicate with each other with the oil paths restricted by a boom pressure compensation restrictor 71.

Further, a bucket first oil path L51 is provided to be connected to the first branch pump oil path L11. The bucket first oil path L51 is connected to the bucket control valve 115. The bucket control valve 115 is a three-position switching valve including six ports to which six lines (a bucket first oil path L51 to a bucket sixth oil path L56) are respectively connected. The bucket second oil path L52 is connected to an inlet port of a bucket pressure compensation valve 80, the bucket third oil path L53 is connected to an outlet port of the bucket pressure compensation valve 80, the bucket fourth oil path L54 is connected to a bottom-side oil chamber of the bucket cylinder 38, the bucket fifth oil path L55 is connected to a rod-side oil chamber of the bucket cylinder 38, and the bucket sixth oil path L56 is connected to the tank oil path LT. The bucket second oil path L52 is connected to the feedback oil path L20 via a bucket pilot oil path L57 including a check valve 83. The check valve 83 is closed when the hydraulic pressure in the feedback oil path L20 is higher than a hydraulic pressure in the bucket second oil path L52, and is opened when a reverse pressure relationship holds. A check valve 84 is provided in the bucket third oil path L53, to prevent backflow.

The bucket control valve 115 has pilot ports 115a and 115b respectively provided at both its ends (upper and lower ends in FIG. 3), and pilot pressure supply oil paths L45 and L46 are respectively connected to the pilot ports 115a and 115b. A bucket pilot hydraulic pressure is supplied in response to a bucket working lever operation to the pilot pressure supply oil paths L45 and L46 from the pilot pressure supply valve unit 130 so that a working of the bucket control valve 115 is controlled to work. FIG. 3 illustrates a state where the bucket working lever operation is not performed, a bucket working lever is at a neutral position, a pilot pressure is not supplied to the pilot pressure supply oil paths L45 and L46, and the bucket control valve 115 is positioned at a neutral position. In this state, all the six ports to which the six lines (the bucket first oil path L51 to the bucket sixth oil path L56) are respectively connected each enter a closed state.

Then, a case where a pilot pressure is supplied to the pilot port 115a from the pilot pressure supply valve unit 130 via the pilot pressure supply oil path L45 by the bucket working lever operation being performed will be described. When the pilot pressure is supplied to the pilot port 115a from the pilot pressure supply valve unit 130 via the pilot pressure supply oil path L45, the bucket control valve 115 is moved downward as shown in FIG. 3 (see FIG. 5). As a result, the bucket first oil path L51 communicates with the bucket second oil path L52. A communication opening at this time is set to change depending on the magnitude of the pilot pressure (i.e., the magnitude of an operation amount of the bucket working lever operation). That is, in the bucket control valve 115, a spool moves upon receiving the pilot pressure, and an opening area A2 of the bucket control valve 115 (an area in which the bucket first oil path L51 and the bucket second oil path L52 communicate with each other) changes depending on a spool movement amount (spool stroke).

Figure 7:
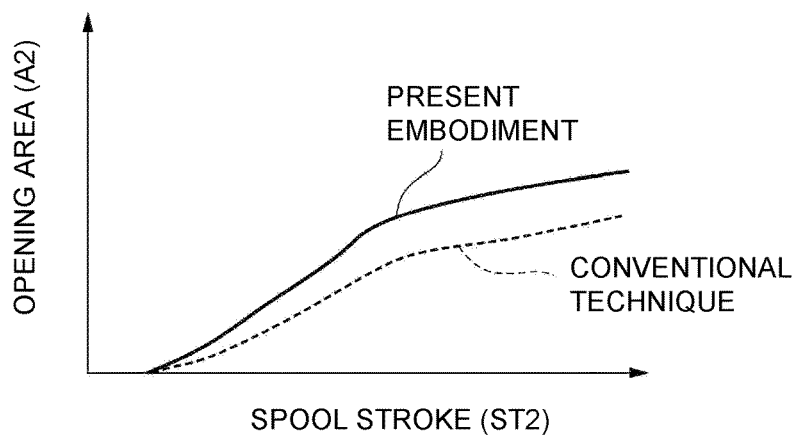
FIG. 7 is a graph illustrating a relationship between a spool stroke (ST2) and a valve opening area (A2) in the bucket control valve.
Figure 8:
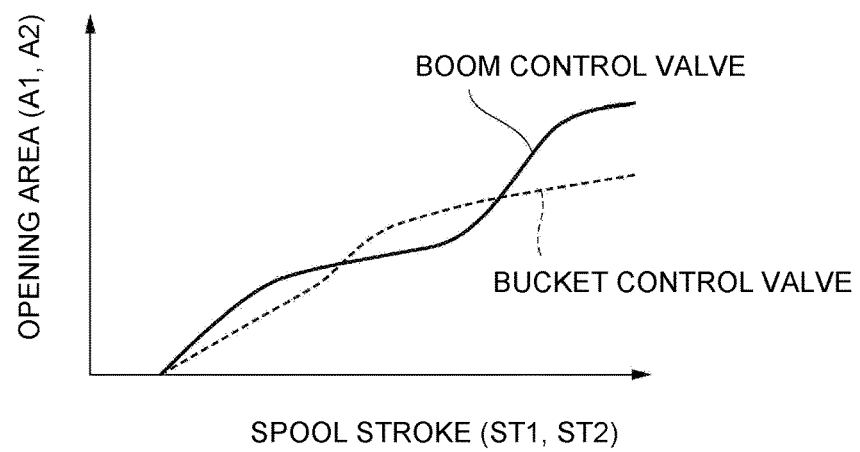
FIG. 8 is a graph illustrating a relationship between the spool stroke (ST1, ST2) and a valve opening area (A1, A2) in a composite working of the boom control valve and the bucket control valve.

The opening area A2 is set, as indicated by a solid line in FIG. 7, with respect to a spool stroke ST2. The spool stroke ST2 changes depending on the magnitude of the pilot pressure (i.e., the magnitude of the operation amount of the bucket working lever operation). A relationship set in a conventional bucket control valve is indicated by a broken line in FIG. 7. Thus, in a conventional technique, the conventional bucket control valve is made to have a load sensing restriction function by decreasing an opening area with respect to a spool stroke so that a predetermined differential pressure occurs in a portion where the opening area has been decreased. However, the bucket control valve 115 in the present embodiment is controlled to have a pump discharge amount corresponding to the magnitude of the operation amount of the bucket working lever operation, as described below, whereby a differential pressure need not be produced in this portion. Therefore, the bucket control valve is configured not using a load sensing restriction function by increasing the opening area. That is, the opening area A2 illustrated in FIG. 7 is set to such an area as to allow passage of discharge oil from the first pump P1 the discharge amount of which is to be controlled to correspond to the magnitude of the operation amount of the bucket working lever operation as it is but to limit a flow rate exceeding the discharge oil amount. In this meaning, the bucket control valve may have an oil path switching function, and the opening area A2 need not be variably set. However, when a plurality of valve workings are performed (e.g., when the boom and bucket working lever operations are simultaneously performed), setting as illustrated in FIG. 8 is performed such that oil having a desired flow rate corresponding to each of lever operation amounts can be supplied to the corresponding actuator (the boom cylinder 36 and the bucket cylinder 38).

Further, with the bucket control valve 115 moved downward, the bucket third oil path L53 communicates with the bucket fourth oil path L54, and the bucket fifth oil path L55 communicates with the bucket sixth oil path L56.

On the other hand, when a pilot pressure is supplied to the pilot port 115b from the pilot pressure supply valve unit 130 via the pilot pressure supply oil path L46 by the bucket working lever operation in an opposite direction to that described above being performed, the bucket control valve 115 is moved upward in FIG. 3. As a result, the bucket first oil path L51 communicates with the bucket second oil path L52, the bucket third oil path L53 communicates with the bucket fifth oil path L55, and the bucket fourth oil path L54 communicates with the bucket sixth oil path L56.

The bucket pressure compensation valve 80 is a two-position switching valve, and receives a hydraulic pressure in the feedback oil path L20 on the side of its upper end and receives a hydraulic pressure in the bucket second oil path L52 on the side of its lower end. The bucket pressure compensation valve 80 includes a spring that urges the bucket pressure compensation valve 80 upward. Accordingly, when the hydraulic pressure in the feedback oil path L20 is smaller than a force obtained by adding a spring urging force to the hydraulic pressure in the bucket second oil path L52, there occurs a state where the bucket pressure compensation valve 80 moves upward as illustrated, to make the bucket second oil path L52 and the bucket third oil path L53 communicate with each other as they are. When the hydraulic pressure in the feedback oil path L20 is larger than a force obtained by adding the spring urging force to the hydraulic pressure in the bucket second oil path L52, the bucket pressure compensation valve 80 moves downward, and the bucket second oil path L52 and the bucket third oil path L53 communicate with each other with the oil paths restricted via a bucket pressure compensation restrictor 81.

The working of the working control device 100 configured as described above will be described below. When the operator performs the boom working lever operation, the operation device 160 feeds signals respectively representing its operation direction and operation amount to the controller 150. The controller 150 performs rotation driving control of the first electric motor M1 via the inverter 106 based on such operation information, and controls a discharge amount from the first hydraulic pump P1. As the rotation driving control, the controller 150 sets a discharge amount of the first hydraulic pump P1 required for the actuator (e.g., the boom cylinder 36, the bucket cylinder 38) to have a working speed corresponding to a lever operation amount and performs the rotation driving control of the first electric motor M1 to obtain the set pump discharge amount. The first hydraulic pump P1 may comprise a variable displacement type pump, and discharge amount control of the first hydraulic pump P1 may be performed for the actuator (e.g., the boom cylinder 36, the bucket cylinder 38) to have a working speed corresponding to the lever operation amount. The controller 150 also performs working control of the pilot pressure supply valve unit 130 in parallel with the control.

The control by the controller 150 is also performed with a lever operation not performed. With the lever operation not performed by the operator, both the boom control valve 113 and the bucket control valve 115 are each in a neutral state, and are as illustrated in FIG. 3. In the neutral state, all the six ports to be respectively connected to the six lines (the boom first oil path L31 to the boom sixth oil path L36) each enter a closed state in the boom control valve 113, and all the six ports to be respectively connected to the six lines (the bucket first oil path L51 to the bucket sixth oil path L56) each similarly enter a closed state in the bucket control valve 115. As a result, pressures in the boom second oil path L32 and the bucket second oil path L52 are respectively low pressures, and a pressure in the feedback oil path L20 to be connected to the oil paths, respectively, via the boom and bucket pilot oil paths L37 and L57 is also a low pressure. Accordingly, a hydraulic pressure in the pump oil path L1 (and the first and second branch pump oil paths L11 and L12) is also set to a low pressure by the unload valve 60 to be operated upon receiving a hydraulic pressure in the feedback oil path L20. In this state, a discharge oil amount from the first hydraulic pump P1 is not required or may be a necessary minimum, and the controller 150 performs control to stop the first electric motor M1 or control to drive the first electric motor M1 to rotate in a minimum number of revolutions. As a result, power consumption required to drive the first electric motor M1 can be minimized.

Then, the working in a case where the operator operates the work operation levers 161 and 162 to perform the boom working lever operation and the bucket working lever operation will be described below. First, a case where only the boom working lever operation (a single operation) has been performed will be described with reference to FIG. 4.

In this case, rotation driving control of the first electric motor M1 by the controller 150 is first performed. When the operator performs the boom working lever operation, the controller 150 sets a discharge amount of the first hydraulic pump P1 required for the actuator (e.g., the boom cylinder 36) to have a working speed corresponding to a lever operation amount and performs the rotation driving control of the first electric motor M1 to obtain the set pump discharge amount. Further, in parallel therewith, working control of the pilot pressure supply valve unit 130 is also performed. The controller 150 controls a working of the pilot pressure supply valve unit 130, to supply a pilot pressure to the pilot port 113a from the pilot pressure supply valve unit 130 via the pilot pressure supply oil path L41, for example. Consequently, the boom control valve 113 is moved downward, to enter a state illustrated in FIG. 4. When a boom working lever operation opposite thereto has been performed, a pilot pressure is supplied to the pilot port 113b, and the boom control valve 113 is moved upward. The bucket working lever operation has not been performed. Thus, the bucket control valve 115 is at a neutral position as illustrated, and the six ports are closed.

In the state illustrated in FIG. 4, the boom control valve 113 makes the boom first oil path L31 communicate with the boom second oil path L32, makes the boom third oil path L33 communicate with the boom fourth oil path L34, and makes the boom fifth oil path L35 communicate with the boom sixth oil path L36. In this state, the boom second oil path L32 and the feedback oil path L20 communicate with each other via the boom pilot oil path L37, and a hydraulic pressure in the boom second oil path L32 and a hydraulic pressure in the feedback oil path L20 are equal to each other. Accordingly, the boom pressure compensation valve 70 is moved upward with a spring urging force, and the boom second oil path L32 and the boom third oil path L33 communicate with each other as they are.

As a result, although discharge oil in the first hydraulic pump P1 flows from the boom first oil path L31 to the boom second oil path L32, a communication opening area A1 between the oil paths is set to change depending on the magnitude of a pilot pressure, and is indicated by a solid line in FIG. 6. Accordingly, a flow rate of the discharge oil flowing through the boom second oil path L32 is a flow rate corresponding to the opening area indicated by the solid line in FIG. 6. The opening area A1 indicated by the solid line in FIG. 6 is set to such an area as to allow passage of discharge oil from the first pump P1 the discharge amount of which is to be controlled to correspond to the magnitude of an operation amount of the boom working lever operation as it is, as described above. Accordingly, the discharge oil from the first hydraulic pump P1 is not limited, to flow from the boom first oil path L31 to the boom second oil path L32 as it is. As a result, a differential pressure that has been required in conventional feedback control need not be produced in the boom control valve 113, a pump discharge pressure can be reduced to correspond to the differential pressure, and pump driving power can be more reduced than in the conventional technique.

Hydraulic oil that has thus flowed through the boom second oil path L32 is fed to the boom fourth oil path L34 through the boom control valve 113 after passing through the check valve 74 from the boom third oil path L33 through the boom pressure compensation valve 70, and is supplied to the bottom-side oil chamber of the boom cylinder 36. As a result, the boom cylinder 36 works to extend. Thus, the hydraulic oil is discharged from the boom fifth oil path L35 from the rod-side oil chamber of the boom cylinder 36, to flow to the tank oil path LT from the boom sixth oil path L36 after passing through the boom control valve 113 and returns to the tank T.

A hydraulic pressure in the boom second oil path L32 (the hydraulic pressure is equal to a hydraulic pressure in the bottom-side oil chamber of the boom cylinder 36) is transmitted to the feedback oil path L20 via the check valve 73, to act on the unload valve 60. Accordingly, the unload valve 60 sets respective hydraulic pressures in the pump oil path L1 and the first and second branch pump oil paths L11 and L12 to correspond to a hydraulic pressure in the feedback oil path L20 (i.e., a hydraulic pressure in the bottom-side oil chamber of the boom cylinder 36).

Then, a case where the operator has operated the work operation levers 161 and 162 and has simultaneously performed the boom working lever operation and the bucket working lever operation (has performed a composite operation) will be described with reference to FIG. 5.

When the composite operation for simultaneously performing the boom working lever operation and the bucket working lever operation is performed, the rotation driving control of the first electric motor M1 by the controller 150 is performed. The controller 150 finds an oil amount required for the boom cylinder 36 to have a working speed corresponding to the boom working lever operation and an oil amount required for the bucket cylinder 38 to have a working speed corresponding to the bucket working lever operation. The controller 150 sets an oil amount obtained by summing both the oil amounts as a discharge amount of the first hydraulic pump P1, and performs the rotation driving control of the first electric motor M1 to obtain the set pump discharge amount.

Further, in parallel therewith, working control of the pilot pressure supply valve unit 130 is also performed. For example, a pilot pressure is supplied to the pilot port 113a from the pilot pressure supply valve unit 130 via the pilot pressure supply oil path L41, and the boom control valve 113 is moved downward. Further, simultaneously therewith, in the bucket control valve 115, a pilot pressure is supplied to the pilot port 115a from the pilot pressure supply valve unit 130 via the pilot pressure supply oil path L45, and the bucket control valve 115 is moved downward. As a result, both the valves 113 and 115 each enter a state illustrated in FIG. 5.

A working of the boom cylinder 36 by the boom control valve 113 at this time, excluding a working of the boom pressure compensation valve 70, is as described above with reference to FIG. 4. Thus, description of the working is omitted, and a working of the bucket cylinder by the bucket control valve 115 will be described. The working of the boom pressure compensation valve 70, together with a working of the bucket pressure compensation valve 80, will be described below.

When the bucket control valve 115 enters the state illustrated in FIG. 5, the bucket first oil path L51 communicates with the bucket second oil path L52, the bucket third oil path L53 communicates with the bucket fourth oil path L54, and the bucket fifth oil path L55 communicates with the bucket sixth oil path L56. As a result, although discharge oil in the first hydraulic pump P1 flows from the bucket first oil path L51 to the bucket second oil path L52, a communication opening area A2 between the oil paths is set to change depending on the magnitude of a pilot pressure, and is indicated by a solid line in FIG. 7.

The opening area A2 indicated by the solid line in FIG. 7 is set to such an area as to allow passage of discharge oil from the first pump P1 the discharge amount of which is to be controlled to correspond to the magnitude of an operation amount of the bucket working lever operation as it is. The boom working lever operation and the bucket working lever operation are simultaneously performed, and a total oil amount of an oil amount required for the boom cylinder 36 to have a working speed corresponding to the boom working lever operation and an oil amount required for the bucket cylinder 38 to have a working speed corresponding to the bucket working lever operation is supplied from the first hydraulic pump P1. At this time, the opening area A2 indicated by the solid line in FIG. 7 is set to make an amount of oil required for the bucket cylinder 38 to have a working speed corresponding to the bucket working lever operation flow without limitation but to limit a flow rate exceeding the oil amount. On the other hand, the communication opening area A1 between the boom first oil path L31 and the boom second oil path L32 in the boom control valve 113 is set to make an amount of oil required for the boom cylinder 36 to have a working speed corresponding to the boom working lever operation flow without limitation but to limit a flow rate exceeding the oil amount. Control to respectively set the opening areas A1 and A2 of the boom control valve 113 and the bucket control valve 115 as illustrated in FIG. 6 and FIG. 7 is thus performed, to perform control to respectively supply required flow rates corresponding to the boom working lever operation and the bucket working lever operation in a balanced manner.

Hydraulic oil that has thus flowed through the bucket second oil path L52 is fed to the bucket fourth oil path L54 through the bucket control valve 115 after passing through the check valve 84 from the bucket third oil path L53 through the bucket pressure compensation valve 80, and is supplied to the bottom-side oil chamber of the bucket cylinder 38. As a result, the bucket cylinder 38 works to extend. Accordingly, the hydraulic oil is discharged from the bucket fifth oil path L55 from the rod-side oil chamber of the bucket cylinder 38, to flow to the tank oil path LT from the bucket sixth oil path L56 after passing through the bucket control valve 115 and return to the tank.

Respective workings of the boom pressure compensation valve 70 and the bucket pressure compensation valve 80 will be described. Both the boom pressure compensation valve 70 and the bucket pressure compensation valve 80 are controlled to work upon receiving a hydraulic pressure in the feedback oil path L20 on the side of its upper end and receiving respective hydraulic pressures in the boom second oil path L32 and the bucket second oil path L52 on the side of its lower end. Respective working loads of the boom cylinder 36 and the bucket cylinder 38 vary depending on a work content, and a hydraulic pressure corresponding to the working load is generated in each of the oil paths. A case where a load of the boom cylinder 36 is large, a load of the bucket cylinder 38 is small, and hydraulic pressures in the boom first oil path L31 to the boom fourth oil path L34 are respectively higher than hydraulic pressures in the bucket first oil path L51 to the bucket fourth oil path L54 will be considered as an example.

The hydraulic pressure in the boom second oil path L32 is transmitted to the feedback oil path L20 via the boom pilot oil path L37, and the hydraulic pressure in the bucket second oil path L52 is transmitted to the feedback oil path L20 via the bucket pilot oil path L57. At this time, the check valves 73 and 83 are respectively provided in both the pilot oil paths L37 and L57. Thus, although the hydraulic pressure in the boom second oil path L32 on the high-pressure side is transmitted to the feedback oil path L20, the hydraulic pressure in the bucket second oil path L52 on the low-pressure side is not transmitted thereto upon being blocked by the check valve 83. As a result, the boom pressure compensation valve 70 is moved upward to make the boom second oil path L32 and the boom third oil path L33 communicate with each other as they are. On the other hand, the bucket pressure compensation valve 80 is moved downward to constitute an oil path passing through the bucket pressure compensation restrictor 81 because the hydraulic pressure in the feedback oil path L20 is higher than the hydraulic pressure in the bucket second oil path L52.

When the composite operation of the boom working lever operation and the bucket working lever operation is thus performed, an oil path of the boom pressure compensation valve 70 is not limited while remaining opened on the side on which respective load pressures in the boom cylinder 36 and the bucket cylinder 38 that work in response to the operation increase, e.g., on the boom cylinder side in the above-described case. However, an oil path of the bucket pressure compensation valve 80 is limited by the bucket pressure compensation restrictor 81 on the side on which the load pressures decrease, e.g., on the bucket cylinder side. In the device, hydraulic oil is supplied to both the cylinders 36 and 38 from the first hydraulic pump P1 as the same hydraulic oil supply source. Accordingly, there is a problem that a large amount of hydraulic oil flows to the cylinder having the lower load so that a supplied oil amount of the cylinder having the higher load decreases. Therefore, a flow rate of the cylinder having the lower load is limited by the pressure compensation restrictor 81, to prevent this problem. This makes it possible to set a flow ratio of the boom cylinder 36 and the bucket cylinder 38. For example, a working of the bucket cylinder 38 can be given priority to if the bucket pressure compensation restrictor 81 is widened, and a working of the boom cylinder 36 can be given priority to if the bucket pressure compensation restrictor 81 is narrowed. The same applies to the boom pressure compensation restrictor 71. The working of the boom cylinder 36 can be given priority to if the boom pressure compensation restrictor 71 is widened, and the working of the bucket cylinder 38 can be given priority to if the boom pressure compensation restrictor 71 is narrowed.

As can be seen from the foregoing description, when the composite operation is performed, hydraulic oil in an oil amount required to make the boom cylinder 36 work at a speed corresponding to the lever operation is supplied to the boom cylinder 36 upon controlling a flow rate by the boom control valve 113, and hydraulic oil in an oil amount required to make the bucket cylinder 38 work at a speed corresponding to the lever operation is simultaneously supplied to the bucket cylinder 38 upon controlling a flow rate by the bucket control valve 115. A relationship between the spool stroke ST1 and the valve opening area A1 in the boom control valve 113 and a relationship between the spool stroke ST2 and the valve opening area A2 in the bucket control valve 115 at this time are illustrated in FIG. 8.

Although the embodiment of the present invention has been described above, the scope of the present invention is not limited to the above-described embodiment. For example, although the above embodiment is configured such that the respective openings of the control valves 111 to 118 are controlled by the pilot pressure to be supplied from the pilot pressure supply valve unit 130, it may be configured such that the control valves 111 to 118 each comprise an electromagnetic proportion type control valve and the respective openings of the control valves 111 to 118 are electromagnetically controlled. The openings of the control valves 111 to 118 may be controlled using a driving device such as an electric motor.

Although the first hydraulic pump P1 and the turning hydraulic pump P2 each comprise a fixed displacement type hydraulic pump in the above-described embodiment, the hydraulic pumps P1 and P2 may be each a variable displacement type hydraulic pump. The hydraulic pump P1 and the turning hydraulic pump P2 may each comprise a variable displacement type hydraulic pump to be driven by an engine to perform variable displacement control.

Setting of respective working characteristics of hydraulic actuators corresponding to an operation of an operation lever may be changeable for each of the hydraulic actuators. For example, to change setting of a correspondence between an operation amount of the operation lever and a working speed (supply oil amount) of the corresponding hydraulic actuator, setting of a ratio of a required discharge flow rate and an operation amount may be changeable. The setting can be changed via a portable computer (loaded with a program for changing the setting) to be electrically connected to the controller 150, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This invention claims the benefit of Japanese Patent Application No. 2021-178942 which is hereby incorporated by reference.

EXPLANATION ABOUT NUMERALS AND CHARACTERS 1 hydraulic shovel
10 lower traveling unit
16L, 16R traveling motor
20 upper turning body
26 turning motor
30 shovel device
36 boom cylinder
37 arm cylinder
38 bucket cylinder
100 working control device
110 control valve unit
113 boom control valve
115 bucket control valve
130 pilot pressure supply valve unit
150 controller
160 operation device
M1 first electric motor M2 second electric motor
P1 first hydraulic pump
P2 turning hydraulic pump

The invention claimed is:

1. A working control device for a working vehicle with a hydraulic working device, comprising:
a hydraulic actuator for driving the hydraulic working device;
an operation device that is operated by an operator to drive the hydraulic working device upon making the hydraulic actuator work;
a hydraulic oil supply source that includes a hydraulic pump and delivers hydraulic oil required to drive the hydraulic actuator; and
a controller that controls an amount of oil to be delivered from the hydraulic oil supply source in response to an operation of the operation device, wherein
the controller is configured to perform a supplying oil amount control to deliver from the hydraulic oil supply source a required amount of oil for the hydraulic actuator to have a working speed corresponding to the operation of the operation device without causing a pressure difference between a hydraulic pressure supplied from the hydraulic oil supply source and a hydraulic pressure supplied to the hydraulic actuator,
a hydraulic oil supply control device that includes a hydraulic oil supply control valve is provided in a flow path leading to the hydraulic actuator from the hydraulic oil supply source and controls an area of the flow path in response to an operation of the operation device, and
the hydraulic oil supply control device performs a control of setting the flow path area in response to an operation of the operation device so as to pass a required amount of oil without limitation, but to limit supply of hydraulic oil exceeding the required amount of oil.

2. The working control device in the working vehicle according to claim 1, wherein
the hydraulic pujp is to be driven by an electric motor,
the controller controls a number of revolutions of the electric motor.

3. The working control device in the working vehicle according to claim 2, wherein the hydraulic pump is a fixed displacement type hydraulic pump.

4. The working control device in the working vehicle according to claim 2, wherein the hydraulic pump is a variable displacement type hydraulic pump.

5. The working control device in the working vehicle according to claim 1, wherein
the hydraulic pump is a variable displacement type hydraulic pump to be driven by an engine, and
the controller performs variable displacement control of the hydraulic pump.

6. A working control device for a working vehicle with a hydraulic working device that performs a plurality of workings, comprising:
a plurality of hydraulic actuators for making the hydraulic working device perform the plurality of workings;
an operation device enabling a plurality of operations to be performed by an operator to make the plurality of hydraulic actuators selectively or compositely work to drive the hydraulic working device;
a hydraulic oil supply source that includes a hydraulic pump and delivers hydraulic oil required to drive the plurality of hydraulic actuators;
a controller that controls an amount of oil to be delivered from the hydraulic oil supply source in response to operations of the operation device; and
a plurality of hydraulic oil supply control devices each including a hydraulic oil supply control valve that are respectively provided in a plurality of flow paths leading to the plurality of hydraulic actuators from the hydraulic oil supply source and each control an area of the flow path in response to the corresponding operation of the operation device, wherein
the controller is configured to perform a supplying oil amount control to deliver from the hydraulic oil supply source an amount of oil corresponding to a total amount of oil amounts respectively required to make the plurality of hydraulic actuators work at speeds corresponding to operations of the operation device without causing a pressure difference between a hydraulic pressure from the hydraulic oil supply source and a hydraulic pressure to the hydraulic actuator, and
the plurality of hydraulic oil supply control devices each control the area of the flow path in response to the corresponding operation of the operation device and control the flow path area in response to operations of the operation device so as to pass a required amount of oil for the hydraulic actuator to have a working speed corresponding to the corresponding operation of the operation device without limitation but to limit supply of hydraulic oil exceeding the required amount of oil.

7. The hydraulic control device in the working vehicle according to claim 6, wherein
a pressure compensation valve is provided in each of the plurality of hydraulic oil supply control devices, and
the pressure compensation valve limits, when control to make the plurality of hydraulic actuators compositely work upon compositely operating the operation device has been performed, an amount of supply oil to the hydraulic actuator having a lower hydraulic oil pressure among the plurality of hydraulic actuators and keeps a supply oil amount balance.

8. The working control device in the working vehicle according to claim 6, wherein
the hydraulic pump is to be driven by an electric motor,
the controller controls a number of revolutions of the electric motor.

9. The working control device in the working vehicle according to claim 8, wherein the hydraulic pump is a fixed displacement type hydraulic pump.

10. The working control device in the working vehicle according to claim 8, wherein the hydraulic pump is a variable displacement type hydraulic pump.

11. The working control device in the working vehicle according to claim 6, wherein
the hydraulic pump is a variable displacement type hydraulic pump to be driven by an engine, and
the controller performs variable displacement control of the hydraulic pump.

* * * * *